(12) United States Patent
Gillette et al.

(10) Patent No.: US 7,932,309 B2
(45) Date of Patent: Apr. 26, 2011

(54) ETHER DERIVATIVES OF RAW COTTON LINTERS FOR WATER-BORNE COATINGS

(75) Inventors: Paul C. Gillette, Newark, DE (US); Arjun C. Sau, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 11/591,774

(22) Filed: Nov. 2, 2006

(65) Prior Publication Data

US 2007/0105985 A1    May 10, 2007

Related U.S. Application Data

(60) Provisional application No. 60/733,579, filed on Nov. 4, 2005.

(51) Int. Cl.
C08G 79/02 (2006.01)
C08L 97/02 (2006.01)
C09D 197/02 (2006.01)
C09J 197/02 (2006.01)

(52) U.S. Cl. .................... 524/34; 106/164.01
(58) Field of Classification Search .............. 524/34; 106/164.01
See application file for complete search history.

(56) References Cited

U.S. PATENT DOCUMENTS

| | | | | |
|---|---|---|---|---|
| 2,591,368 A * | 4/1952 | McCarthy | 524/45 |
| 2,810,162 A * | 10/1957 | Bechtold et al. | 264/187 |
| 2,856,402 A * | 10/1958 | Turner | 162/9 |
| 3,053,683 A * | 9/1962 | Yolles | 427/220 |
| 3,415,755 A * | 12/1968 | Luck | 510/204 |
| 3,507,852 A * | 4/1970 | Kuchmy | 536/3 |
| 3,870,703 A * | 3/1975 | Gibney et al. | 536/70 |
| 3,926,951 A * | 12/1975 | Lindenfors et al. | 536/91 |
| 3,932,319 A * | 1/1976 | Clendinning et al. | 47/74 |
| 4,031,055 A * | 6/1977 | Dupont et al. | 523/122 |
| 4,096,326 A * | 6/1978 | Reid | 536/95 |
| 4,151,129 A * | 4/1979 | Hollaway, Jr. | 524/34 |
| 4,636,548 A * | 1/1987 | Kossmann et al. | 524/524 |
| 4,663,384 A * | 5/1987 | Penzel et al. | 524/519 |
| 4,820,813 A * | 4/1989 | Schulz | 536/84 |
| 4,826,970 A * | 5/1989 | Reid et al. | 536/66 |
| 5,002,985 A * | 3/1991 | Andersson et al. | 524/42 |
| 5,171,637 A * | 12/1992 | Stiberth et al. | 428/436 |
| 5,236,959 A * | 8/1993 | Oakley et al. | 521/48.5 |
| 5,342,854 A * | 8/1994 | Serad | 521/48 |
| 5,470,519 A * | 11/1995 | Markulin | 264/193 |
| 5,496,908 A * | 3/1996 | Bostrom et al. | 528/74.5 |
| 5,905,114 A * | 5/1999 | Baumstark et al. | 524/801 |
| 2002/0103368 A1* | 8/2002 | Harding et al. | 536/96 |
| 2002/0198292 A1* | 12/2002 | Kayser et al. | 524/2 |
| 2002/0198293 A1* | 12/2002 | Craun et al. | 524/47 |
| 2003/0004261 A1* | 1/2003 | Sarkar et al. | 524/502 |
| 2003/0040622 A1* | 2/2003 | Lahteenmaki et al. | 536/84 |
| 2003/0078338 A1* | 4/2003 | Schlarb et al. | 524/556 |
| 2003/0092833 A1* | 5/2003 | Frieling et al. | 524/589 |
| 2004/0180993 A1* | 9/2004 | Shelton et al. | 524/38 |
| 2005/0020744 A1* | 1/2005 | Cabrera et al. | 524/386 |
| 2005/0235878 A1* | 10/2005 | Podlas | 106/618 |

FOREIGN PATENT DOCUMENTS

DE    4034709 A  *  5/1991
DE    4034709 A1     5/1991

* cited by examiner

Primary Examiner — Mark Eashoo
Assistant Examiner — Liam J Heincer
(74) Attorney, Agent, or Firm — Robert O'Flynn O'Brien; Joanne Mary Fobare Rossi

(57) ABSTRACT

A water-borne coating composition containing an ether derivative of raw cotton linters (RCL), a latex polymer, and water in which the ether derivative RCL provides improved rheological properties when compared to analogous cellulose ether compounds produced from more refined cellulose sources while not substantially degrading the coating composition's aesthetic qualities.

18 Claims, No Drawings

ETHER DERIVATIVES OF RAW COTTON LINTERS FOR WATER-BORNE COATINGS

RELATED APPLICATIONS

This application claims the benefit of U.S. Provisional Application Ser. No. 60/733,579 filed on Nov. 4, 2005, which is incorporated herein by reference in its entirety.

FILED OF INVENTION

This invention relates to thickening aqueous or water-borne coating systems using polymeric systems. More particularly, this invention relates to improving thickening of aqueous or water-borne coating compositions using ether derivatives of raw cotton linters.

BACKGROUND OF THE INVENTION

A wide variety of water-soluble polymers are used to thicken and control rheology of aqueous or water-borne coatings, particularly latex paints. Functions of the water-soluble polymers in water-borne coatings include adding viscosity to the coatings, maintaining the viscosity during storage, and providing desired rheological properties during application of the coatings.

In a typical aqueous coating formulation, 0.1-5.0 wt % of a water-soluble polymer based on the weight of the wet coating is added to the coatings formulation to achieve a desired target viscosity. This target viscosity is typically determined using a Stormer viscometer which reports viscosity in Krebs Unit (KU). For typical water-borne coatings, the Stormer viscosity ranges from 85 to 120 KU. The amount of natural polymers, semi-synthetic polymers, and synthetic water-soluble polymers, known as dry thickener, used to adjust the Stormer viscosity of the coatings to a target viscosity, typically ~100 KU, is called thickening efficiency (TE) or thickener demand. TE is expressed as weight fraction of the dry thickener with respect to the total weight of the wet coating. North American coatings manufacturers, however, prefer to express TE as pounds of dry thickener required per 100 gallons of wet coatings.

So far as the choice of a thickener is concerned, overall performance and cost of the thickener based on the amount used in the formulation are critical to coatings manufacturers. One way to reduce manufacturing cost by coatings manufacturers is to use low-cost thickeners. Oftentimes, to reduce manufacturing cost, coatings manufacturers use low-cost thickeners even though the use of these low-cost thickeners sacrifices certain desired performance attributes of the coatings. Ultimately the choice of thickener is determined by its unit cost in use subject to fulfilling acceptable performance criteria.

Among the types of water-soluble polymers used in water-borne coatings are natural polymers, semi-synthetic polymers, and synthetic water-soluble polymers. Naturally occurring water-soluble polymers include guar, starch, casein, and alginates. Among semi-synthetic water-soluble polymers, cellulose ethers are the thickeners of choice to formulate water-borne coatings. Examples of cellulose ethers are hydroxyethylcellulose (HEC), hydroxypropylcellulose (HPC), methylcellulose (MC), hydroxypropylmethylcellulose (HPMC), methylhydroxyethylcellulose (MHEC), methylethylhydroxyethylcellulose (MEHEC), ethylhydroxyethylcellulose (EHEC), carboxymethylcellulose (CMC), hydrophobically modified hydroxyethylcellulose (HMHEC), hydrophobically modified ethylhydroxyethylcellulose (HMEHEC), hydrophobically modified carboxymethylcellulose (HMCMC), hydrophobically modified carboxymethylhydroxylethylcellulose (HMCMHEC), and hydrophobically modified sulfoalkyl hydroxylalkylcelluloses.

The most recent significant development in thickeners is a class of water-soluble polymers having enhanced solution viscosity and thickening efficiency. These water-soluble polymers are called hydrophobically modified water-soluble polymers as they bear a small amount of hydrophobic moieties. In contrast to having inter-chain connections through covalent or ionic linkages, these polymers display inter-chain connections mediated through the congregation of the hydrophobic moieties from different polymer chains. However, these polymers are expensive.

While presently available cellulose ethers produced from purified celluloses, such as chemical cotton (also referred to as purified cotton linters) and wood pulps, can provide the intended performance desired in the marketplace, in many coatings formulations they are not the thickeners of choice because of their high cost in use. To lower coatings manufacturing costs, coating manufactures use less expensive synthetic water-soluble polymers in place of cellulose ethers. These low cost thickeners include polyacrylates and hydrophobically modified polyacrylates. However, water-borne coatings formulated with polyacrylates thickeners tend to form water-sensitive films. For this reason, polyacrylates thickeners are not suitable for thickening water-borne coatings intended for use in coating surfaces that are subject to external insults, such as rain or exposure to high humidity and alkaline materials.

Given the superior performance of cellulose ethers, coating manufacturers would use more cellulose ethers in coatings formulations if these materials could be made more cost effective by either reducing their use levels in the coatings formulations or providing more cost-effective manufacturing through raw material or process innovations.

By designing cellulose ethers with superior viscosity buildup capacity, their use level in water-borne coatings formulations can be reduced. One approach to increase the solution viscosity of cellulose ethers and other water-soluble polymers at a fixed concentration is to cross-link the polymer chains using a suitable cross-linking agent. The nature of the cross-linking can be covalent (permanent bond), electrostatic (ionic bond), hydrogen-bonding or hydrophobic association (pseudo-crosslink) in aqueous solution depending on the nature of the water-soluble polymer and the cross-linking agent. For nonionic water-soluble polymers, cross-linking has to be covalent in nature. However, for ionic water-soluble polymers, the cross-linking can be both covalent and electrostatic provided the polymers possess functional groups capable of reacting with the cross-linker. Since excessive cross-linking tends to form an insoluble species, water-soluble polymers are only modestly cross-linked to maintain the desired solubility. A major problem of using cross-linkers to increase the molecular weight of water-soluble polymers is to control the degree of cross-linking so that no water-insoluble species are formed. Another drawback of using chemically reactive cross-linkers is that due to their high reactivity and toxicity, they often pose significant health risks to those who handle them.

Natural polymer-based thickeners are appealing to manufacturers and consumers in that they are made from renewable resources. For this reason, cellulose ethers continue to be popular. Cellulose is a naturally occurring high molecular weight linear polymer composed of anhydroglucose units that are connected through 1,4-β-glycosidic linkages. Each anhydroglucose unit has three hydroxyl groups that can react with etherifying agents. Cellulose is the structural polymer that provides mechanical properties to all higher-plant cells. In nature, it occurs in the form of microfibrils that are themselves organized into fibers, cell walls, etc. Depending on the source of the natural cellulose, it can be almost pure or it can be admixed with impurities. Cotton lint or staple fiber collected from cottonseed is almost pure cellulose. They are, however, expensive and used almost exclusively in the textile industry. They are not typically used to manufacture cellulose ethers.

Raw cotton linters ("RCL") are an excellent source of high molecular weight cellulose. Raw cotton linters, also commonly referred to as "linters", are short fiber residues which are left on the cottonseed after the longer staple ("lint") fibers are removed by ginning and which have not been subjected to chemical cleaning steps which are typically performed to yield high purity furnish. Linters are shorter, thicker, and more colored fibers than lint. They also adhere more strongly to the cottonseed relative to lint. Raw cotton linters are removed from cottonseeds using a number of technologies including lint saws and abrasive grinding methods, both of which yield suitable materials. The amount of hemicellulose, lignin, colored impurities and foreign matter in the various types of raw cotton linters increases with the number of passes or "cuts" used in removing the inter from the cottonseed. First cut linters typically contain the least amount of impurities and foreign matter and subsequent cuts contain more impurities and foreign matter. Typically, the cellulose content of RCL is about 69-78 wt % as measured by the American Oil Chemists' Society (AOCS) "bB 3-47: Cellulose Yield Pressure-Cook Method". The balance of noncellulosic materials found in the RCL consists primarily of seed hulls, dirt, field trash, lignin, hemicellulose, wax, fat, protein, moisture and traces of other organic impurities. Some of these noncellulosic materials could result in visible imperfections in any resultant coating if not removed.

Typically, for the manufacture of cellulose ether derivatives, RCL is purified by mechanical and chemical means to yield a high purity furnish. Purified cellulose obtained from RCL is also known as chemical cotton or purified cotton linters. However, processing steps associated the purification of RCL to form chemical cotton or purified cotton linters greatly increases the cost of cellulose ethers made from purified cotton linters. If the RCL is directly converted into its ether derivative, these ether derivatives are typically brown in color, which according to conventional wisdom would be construed as unacceptable for use in making paints and coatings.

For many coatings applications, consistent color and grit-free coatings represent key performance attributes. The typical cellulose content of raw cotton linters is about 69-78 wt %. The rest of the noncellulosic impurities include hemicellulose, lignin, waxes, and inorganic impurities. Currently, noncellulosic impurities, such as hemicellulose and lignin, from RCL are removed by a combination of mechanical and chemical means. However, these treatments occasion changes in fiber morphology and molecular weight loss of cellulose. The fiber morphology, in turn, can alter the mode of reaction of the cellulose with a given etherifying agent leading to different structural features, solubility and solution properties of the resulting ether derivative. In addition, purification of the raw cotton linters to remove noncellulosic impurities poses environmental concerns as the byproducts formed are not innocuous.

Development of novel thickeners based on naturally occurring renewable biopolymers is attractive in view of the future unavailability of petroleum based raw materials that are used to make synthetic water-soluble polymers. The present invention is directed to fulfill this need and provides further related advantages in delivering the rheological properties and other desired properties for various water-borne coatings.

SUMMARY OF THE INVENTION

It was surprising to find that ether derivatives made from RCL had rheological properties equivalent to or better than those of ether derivatives made from purified cotton linters. For many coating applications consistent color and grit-free coatings represent key performance attributes. Although cellulose ethers produced from RCL are typically brown in color, it has been unexpectedly found that pigmented coatings produced using these materials as thickeners do not significantly differ in color from analogous compositions formulated with cellulose ethers produced from highly purified cellulose furnishes. Purification of the cotton linters represents a costly operation that presents a number of undesirable environmental challenges which can be avoided using the present invention. In addition to these benefits, it has been found that cellulose ether derivatives produced using RCL have a better TE than those produced using purified cotton linters.

The present invention is directed to a water-borne coating composition comprising an ether derivative of raw cotton linters (RCL), a latex polymer, and water. The ether derivative of RCL of use in the present invention may be selected from the group consisting of ethoxylated RCL, propoxylated RCL, methylated RCL, methylated ethoxylated RCL, methylated propoxylated RCL, ethoxylated ethylated RCL, carboxymethylated RCL, hydrophobically modified ethoxylated RCL, hydrophobically modified ethoxylated ethylated RCL, hydrophobically modified carboxymethylated RCL, hydrophobically modified ethoxylated carboxymethylated RCL, and hydrophobically modified ethoxylated sulfoalkylated RCL.

In the water-borne coating compositions of the present invention, the latex polymer may be selected from the group of acrylics, vinyl-acrylics, styrene-acrylics, vinyls, alkyds, cellulosics (cellulose nitrate, cellulose esters, etc.), coumarone-indenes, epoxies, esters, hydrocarbons, melamines, natural resins, oleo resins, phenolics, polyamides, polyesters, rosins, silicones, styrenes, terpenes, ureas, and urethanes.

Also when the water-borne coating compositions of the present invention are to be used as paint, these compositions will further comprise a pigment. Typical pigments of use in paints may be selected from the group consisting of calcium carbonate, diatomaceous earth, mica, hydrated aluminum oxide, barium sulfate, calcium silicate, clay, silica, talc, titanium dioxide, zinc oxide, aluminum silicate, nepheline syenite, and mixtures thereof.

The water-borne coating composition of the present invention also may contain one or more of the following components typically present in commercial coating compositions such as a binder, a dispersant, a defoamer, a wet-edge agent, a preservative, a coalescing agent, a biocide, a humectant, a pH modifier, and a colorant.

DETAILED DESCRIPTION OF THE INVENTION

It was surprising to find that ether derivatives of RCL had relatively high solution viscosity when compared to ether derivatives made from purified cotton linters. In water-borne coatings, ether derivatives of RCL provided superior thickening efficiency relative to that offered by using cellulose ethers made from purified cotton linters. The use of ether derivative of RCL did not adversely affect the rheological and other performance properties of the coatings, nor did it significantly affect the aesthetics of coatings.

By grafting an appropriate etherifying reagent onto RCL, several ether derivatives were made. These include methyl, ethyl and carboxymethyl derivatives of RCL. Other ether derivatives resulting from addition reaction of RCL with alkylene oxides include ethoxylated, propoxylated, and butoxylated RCL. Mixed ether derivatives include ethoxylated methyl RCL, propoxylated methyl RCL, ethoxylated ethyl RCL, hydrophobically modified ethoxylated RCL, hydrophobically modified propoxylated RCL, hydrophobically modified ethoxylated ethyl RCL, and ethoxylated carboxymethyl RCL.

The process of making ether derivatives of RCL involves treating cut or uncut RCL with a base (generally an alkali) and reacting the resulting base-treated RCL with an etherifying agent or multiple etherifying agents in a closed reactor under an inert atmosphere.

To enhance the reactivity towards the etherifying agent, the RCL can be treated with an inorganic or organic base or mixtures thereof. Examples of inorganic bases are lithium hydroxide, sodium hydroxide, potassium hydroxide, calcium hydroxide, ammonium hydroxide, etc. Examples of strong organic bases include tertiary amines and quaternary ammonium hydroxide. A preferred base is sodium hydroxide.

To prepare ether derivatives of RCL, a wide variety of etherifying agents or a mixture of etherifying agents are used. These include alkyl halides, epoxides, substituted epoxides, and metal salts of alkanoic acids. Examples of etherifying agents are metal salts of monochloroacetic acid, methyl chloride, ethyl chloride, ethylene oxide, propylene oxide, butylene oxide, glycidol, long chain alkyl halides, epoxides bearing a long alkyl chain and epoxides having a hydrophilic segment between the epoxy group and the long alkyl chain. The mixed ether derivatives can be made by reacting RCL simultaneously or sequentially with different etherifying agents.

Etherification can be carried out either in the presence of a non-reactive solvent or without a solvent. A non-reactive solvent is an organic solvent that primarily functions as a liquid medium to efficiently and homogeneously transport and distribute the reactants and thermal energy during the etherification of RCL and has very little or no affinity to react with the etherifying agent. Examples of organic diluents include acetone, methyl ethyl ketone, methanol, ethanol, n-propyl alcohol, isopropanol, n-butyl alcohol, t-butyl alcohol, hydrocarbon solvents and other polar organic solvents. They can be used alone or as mixtures of one or more of the foregoing solvents. Among these solvents, methanol, isopropanol, t-butyl alcohol and heptane are preferred ones. If no diluent is used, the RCL can be sprayed with an aqueous solution of the base under high shear followed by etherification with the etherifying agent. If the etherifying agent is a liquid at 15-20° C., it can also initially serve as a diluent. Gaseous etherifying agents can be added slowly to the base-treated RCL and allowed to react with the RCL at appropriate temperatures.

The ether derivatives of RCL can be purified using an appropriate solvent system to remove the low molecular weight by-products formed during the etherification. RCL ether derivatives that are insoluble in hot water at a temperature of >45° C. could be purified using hot water having a temperature of >60° C.

The RCL ethers of use in the present invention can be made using procedures practiced to make corresponding cellulose ethers. Compositions of cut RCL and processes to make RCL ethers have been described in US Patent Application 20050228174 A1, the disclosure of which is incorporated herein by reference in its entirety.

To uniformly etherify the RCL and reduce the formation of water-insoluble species arising from seed hulls and other impurities present in RCL, it is critical to cut or grind the RCL to very short size. For coatings where a smooth surface is desired, it is preferred that the RCL be cut prior to etherification. Cutting serves to reduce the RCL fiber length resulting in a material in which caustic and etherifying reagents are more uniformly dispersed. In addition to linters fibers, RCL typically contains small quantities of other parts of the cotton plant such as seed hull fragments. Reduction of the size of these materials permits them to be more readily digested and/or reacted during the etherification process. In order to obtain smooth, defect free surfaces in dried paint coating, the RCL ether derivative must be substantially free of insoluble particulates which could form a surface imperfection in the paint.

It is beneficial to reduce the particle size of the RCL either before it is formed into its ether derivative or after it has been derivatized by milling the material. Among the types of devices which may be used to reduce the particle size of the RCL or RCL ether derivative include rotor mills, cutting mills, mortar grinders, disc mills, ball mills and the like.

It is preferable that the particle size of the RCL ether derivative after milling, as determined by its 50% median value in dry powder form as measured using laser diffraction, such as a HELOS laser diffraction sensor available from Sympatec GmbH, be relatively small for use in coatings. Preferably, the 50% median value of RCL ether derivative in dry powder is less than about 100.0 μm, more preferably less than about 95.0 μm, still more preferably less than about 80.0 μm.

The specific requirements of the RCL ether derivative will depend upon the type of paint coating. For example, high-gloss coatings have more stringent requirements than flat coatings. In a preferred embodiment, the RCL should be cut such that a loose mass of comminuted RCL fibers having a bulk density of at least 8 g/100 ml and at least 95% of RCL fibers passing through a US standard sieve size #100 (150 μm opening). In another preferred embodiment, the RCL should be cut such that a loose mass of comminuted RCL fibers having a bulk density of at least 8 g/100 ml and at least 95% of RCL fibers passing through a US standard sieve size #200 (75 μm opening). In the most preferred embodiment, the ether derivative of RCL is prepared from cut RCL, a loose mass of comminuted RCL fibers having a bulk density of at least 8 g/100 ml and at least 95% of RCL fibers passing through a US standard sieve size #325 (45 μm opening).

It is also beneficial to remove non-cellulosic impurities, such as dirt, field trash, debris, seed hulls, etc., by mechanical means prior to etherification of RCL.

The RCL ethers of use in the present invention have been found to efficiently thicken various water-borne systems including latex paints. Various RCL ethers of the present invention that can be used to thicken and control rheology of various water-borne coatings are ethoxylated RCL, propoxylated RCL, methylated RCL, ethoxylated methylated RCL, propoxylated methylated RCL, ethoxylated ethylated RCL, carboxymethylated RCL, hydrophobically modified ethoxylated RCL, hydrophobically modified ethoxylated ethylated RCL, hydrophobically modified carboxymethylated RCL, hydrophobically modified ethoxylated carboxymethylated RCL, and hydrophobically modified ethoxylated sulfoalkylated RCL.

Note that since RCL contains hemicellulose and lignin, the etherified RCL may contain the corresponding ether derivatives of hemicellulose and lignin depending on the etherifying agents used to etherify the RCL.

Water-borne coatings typically contain water, a water-insoluble latex polymer as film former (also referred to as binder), pigment, and thickener. In addition, they may contain other functional additives, such as dispersants, surfactants, biocides/preservatives, coalescing agents (high-boiling organic solvents), plasticizers, stabilizers, viscosifiers, leveling aids, defoamers, anti-skinning agents, extenders, crosslinkers, corrosion inhibitors, surface improvers, matting agents, etc.

A wide variety of latex polymers are used in water-borne coatings. They are made by polymerization of various ethylenically unsaturated monomers, such as ethylene, vinyl, and acrylic monomers. Oftentimes, latex polymers are made by copolymerizing more than one monomer to achieve several desired properties, particularly for applications in latex paints with very little or no volatile organic compounds (VOCs). Examples of synthetic polymeric latexes used in water-borne coatings include homo- or co-polymers of vinyl acetate, methacrylic acid, methylacrylate, methylmethacrylate, ethylacrylate, butyl acrylate, styrene, ethylene, vinyl chloride, vinyl ester of versatic acid(VeoVa), vinyl propionate, butadiene, acrylonitrile, maleates, fumarates, and the like.

The most common pigment used in water-borne coatings is titanium dioxide. Oftentimes, titanium dioxide grades used in water-borne coatings are surface modified with various inorganic oxides, such as silicates, aluminates, and zirconates. Aluminum silicate, nepeline syenite, mica, calcium carbonate, and/or diatomaceous earth can also be employed. For colored coatings, desired colorants are added to water-borne coatings. The colored species could be metallic oxides, such as iron or chromium oxide or synthetic organic pigments. Carbon black is also used as a colorant to tailor the color of a coating.

The type and amount of pigment present in water-borne coatings dictate the performance properties, such as gloss, permeability, scrub resistance, tensile strength, etc. of the dried film. Hence, coatings are characterized by their pigment volume concentration (PVC). The PVC is a percentage and represents the volume ratio of pigment to total solids present in the dried film. PVC is defined as:

$$PVC\% = \frac{\text{Pigment Volume}}{\text{Pigment Volume} + \text{Latex Volume}} \times 100$$

The point at which all voids between pigment particles are just filled with the latex binder is called the critical pigment-volume concentration (CPVC).

PVC for water-borne coatings can range from 15% to 85%.

Typically, a small amount (about 0.1-5.0 wt %) of water-soluble polymers is incorporated into water-borne coatings to achieve the following performance characteristics during manufacturing, storage and applications:
a) Ease of pigment dispersion,
b) Prevention of settling of the suspended particles (latex, pigment, etc.) during storage,
c) Good film build during application to achieve efficient hiding without excessive brush or roller drag,
d) No excessive sagging after application on a vertical surface Typical water-borne paint compositions comprise water, latex film forming polymeric binder, pigment, and thickener. The kind and amount of latex polymer is not critical and may be provided based on procedures well known in the art.

Typical water-borne latex polymers include, but are not limited to, acrylics, alkyds, cellulosics (cellulose nitrate and cellulose esters), coumarone-indenes, epoxies, esters, hydrocarbons, melamines, natural resins, oleo resins, phenolics, polyamides, polyesters, rosins, silicones, styrenes, terpenes, ureas, urethanes, vinyls, vinyl acrylics and the like.

Illustrative latex film forming polymeric binders include, but are not limited to, one or more homo- or copolymers containing one or more of the following monomers: (meth)acrylates, vinyl ester of versatic acid, styrene, ethylene, vinyl chloride, butadiene, vinylidene chloride, vinyl versatate, vinyl propionate, t-butyl acrylate, acrylonitrile, maleates, fumarates, and the like, including plasticized or other derivatives thereof.

The amount of the ether derivative of RCL used in the water-borne coatings of the invention is the amount effective in providing the desired thickening and rheological properties to the coating composition and thus will depend upon both the rheological properties desired and the ether derivative of RCL employed. The preferred minimum amount is about 0.01 wt %, and the most preferred minimum about 0.05 wt % of the wet coating composition. The preferred maximum amount is 10 wt %, and the most preferred maximum amount about 5 wt %.

After incorporating the thickener into the base paint, the appearance of the paint should be smooth. The viscosity of the resulting paint is then measured. In the paint industry, this viscosity is referred to as Stormer viscosity and measured in Krebs unit (KU).

In accordance with the present invention, RCL ether derivatives can be used in water-borne coatings (i.e., lacquers, latex paints, etc.). In the latex paint, the pigment, for example, can be magnesium aluminum silicate, hydrated aluminum oxide, barium sulfate, calcium silicate, clay, silica, talc, titanium dioxide, or zinc oxide. The pigment is determined by the desired results and the manufacturer. Generally, the ratio of the volume of pigment to the volume of total non-volatile material present in paint is referred to as the pigment volume concentration (PVC) which is normally expressed in percent. Latex paints have a PVC upper limit of 85%, preferably 75%, and more preferably 65%. These latex paints have a PVC lower limit of 10% and preferably 20%. More particularly, when the latex paint is high gloss paint, the PVC is from about 15% to about 30%; when the paint is a semi-gloss paint, the PVC is from about 20% to about 35%; and when it is a flat paint, the PVC is from about 40% to about 85%.

Other ingredients that are commonly found in paints are binders (e.g., 100% acrylics, vinyl-acrylics, and styrene-acrylics), dispersants (e.g., polyphosphates, amino alcohols, and acrylic copolymers), defoamers (e.g., nonsilicone and silicone types), humectants/wet-edge agents (e.g., ethylene glycol, propylene glycol, and hexylene glycol), coalescing agents (e.g. glycol ethers/esters and surface-active agents), biocides, pH modifiers, and colorants.

The water-borne coatings may optionally contain other components such as those generally used in such compositions. Typical components include, but are not limited to, one or more of the following: solvents, fillers, dryers, flattening agents, plasticizers, stabilizers, dispersants, surfactants, viscosifiers, suspension agents, flow control agents, defoamers, anti-skinning agents, biocides/preservatives (e.g., non-mercurial type), extenders, filming aids, crosslinkers, surface improvers, corrosion inhibitors, and other ingredients useful in water-borne coating compositions.

The following examples will serve to illustrate the invention, parts and percentages being by weight, unless otherwise indicated.

Example 1

Preparation of Ethoxylated Raw Cotton Linters (Ethoxylated RCL)

The ethoxylated RCL was made by reacting RCL with ethylene oxide according to the teachings of Example 13 of the US Patent Application No. 2005/0228174A1. The average ethoxyl molar substitution of the ethoxylated RCL was about 2.5. The ethoxyl molar substitution is defined as the average number of moles of ethylene oxide grafted per anhydroglucose unit of the cellulose chain. For ethoxylated RCL, the sample might contain ethoxylated lignin and hemicellulose as well as ethoxylated cellulose. The ethoxyl molar substitution of HEC and ethoxylated RCL was determined analytically by the well-known "sealed tube Zeisel-Morgan method" described in Industrial and Engineering Chemistry, Analytical Ed., Vol. 18, p. 500, 1974.

The ethoxylated RCL thus prepared was brown in color and its 1% solution Brookfield viscosity measured using Brookfield viscometer (Model DV-I) at 30 rpm at 25° C. was about 5800 cps.

Example 2

Preparation of Carboxymethylated Raw Cotton Linters (CM-RCL)

The CM-RCL was made according to the teachings of Example 8 of the US Patent Application No. 2005/0228174A1 and characterized by measuring its carboxymethyl degree of substitution (CM DS). The CM DS is defined as the average number of hydroxyl groups of the anhydroglucose units of the cellulose replaced with carboxymethyl groups.

Determination of Carboxymethyl Degree of Substitution (CM DS) of the CM-RCL

The CM DS of the CM-RCL was measured using a method similar to ASTM D1439. The details of the method are as follows.

The CM-RCL sample was suspended in acidified methanol solution (85% methanol and 15% hydrochloric acid solution), and the suspension was stirred to convert the sodium carboxymethyl groups into the corresponding carboxylic acid groups. The resulting acidic polymer was repeatedly washed with ethanol/water to remove excess hydrochloric acid and other low molecular weight species resulting in a purified acid version of the CM-RCL sample.

The purified acid version of the CM-RCL sample was dried. A weighed portion of the dried sample was dissolved in deionized water containing a known amount of sodium hydroxide to neutralize the carboxylic acid groups. The resulting solution was titrated potentiometrically with standardized hydrochloric acid solution and the net titration volume was determined by subtracting the sample titration from a blank titration performed by omitting the sample. The free acid content of the extracted sample was calculated in milliequivalents per gram. The CM DS was calculated as follows:

$$CM\ DS = \frac{162 \times (\text{meq/g free acid})}{1000 - 58 \times (\text{meq/g free acid})}$$

Note that RCL contains lignin and hemicellulose that bear hydroxyl groups. During the course of carboxymethylation of RCL, the lignin and hemicellulose present in the RCL would react with sodium chloroacetate/sodium hydroxide to form the corresponding carboxymethyl derivatives. Therefore, a sample of CM-RCL might contain a small amount of carboxymethylated lignin and carboxymethylated hemicellulose.

The CM-RCL thus prepared was brown in color and its 1% solution Brookfield viscosity measured using Brookfield viscometer (Model DV-I) at 30 rpm at 25° C. was about 8000 cps.

Example 3

Preparation of Methylhydroxyethylated Raw Cotton Linters (MHE-RCL)

The MHE-RCL was made according to the teachings of Example 14 of the US Patent Application No. 2005/0228174A1 and characterized by measuring its methyl degree of substitution (methyl DS) and ethoxyl molar substitution. The methyl DS is defined as the average number of hydroxyl groups of the anhydroglucose units of the cellulose replaced with methyl groups. The ethoxyl molar substitution is defined as the average number of moles of ethylene oxide grafted per anhydroglucose unit of the cellulose chain. For MHE-RCL, the sample might contain a small amount of methylated and ethoxylated lignin and hemicellulose. The methyl DS and ethoxyl molar substitution of the MHE-RCL were determined analytically by the well-known "sealed tube Zeisel-Morgan method" described in Industrial and Engineering Chemistry, Analytical Ed., Vol. 18, p. 500, 1974.

The methyl DS and ethoxyl molar substitution of the MHE-RCL were about 1.8 and 0.3, respectively.

The resulting MHE-RCL was brown in color and its 1% solution Brookfield viscosity measured using Brookfield viscometer (Model DV-I) at 30 rpm at 25° C. was about 8000 cps.

Evaluation of Paint Properties of RCL Ether Derivatives

The following Examples illustrate the use of RCL ether derivatives as thickeners/rheology modifiers in flat latex paints. The various latex paints tested were prepared by adding the various ingredients to a Cowles disperser and mixing them for a specified time period at a specified mixing speed. The details of the ingredients, mixing time and mixing speed for making the various paints are shown in the paint formulas. A brief description of the significance and scale of various paint tests used to assess product performance are described below:

a) Stormer Viscosity (KU)—The viscosity expressed in Krebs Unit (KU) of the fully formulated paint measured initially and 24 hours after paint preparation using a Stormer viscometer. Measurements were performed as described by ASTM D562-01: *Standard Test Method for*

*Consistency of Paints Measuring Krebs Unit (KU) Viscosity Using a Stormer-Type Viscometer.* b) Thickening Efficiency (TE)—The amount (wt %) of dry thickener (rheology modifier) required to be added to the base paint to achieve a target Stormer viscosity of generally in the range 85-120 KU.

c) ICI viscosity—Viscosity of the paint measured using an ICI cone and plate viscometer at 12,000 sec$^{-1}$ and expressed in poise. Measurements were performed as described by ASTM D4287-00: *Standard Test Method for High-Shear Viscosity Using a Cone/Plate Viscometer.* d) Leneta Leveling—This is a subjective determination to indicate the degree of flow of the wet paint to form a uniform and smooth level surface. It is generally rated on a scale of 0-10, with 0=worst and 10=best. Measurements were performed as described by ASTM D4062-88: *Standard Test Method for Leveling of Paints by Draw-Down Method.* f) Sag Resistance—This test measures the ability of a paint to resist sagging (downward flow) or curtaining when applied to a vertical surface. This is measured by the Leneta method using a mid-range bar and determining the wet film thickness (in mils) above which sag occurs. ASTM D4400-89a (*Standard Test Method for Sag Resistance of Paints Using a Multinotch Applicator*) was used to measure this property.

g) Gloss 60°—A measure of the shininess of the dried paint film viewed at an angle of 60° from the surface. It is measured using a gloss meter according to ASTM D3928-93: *Standard Test Method for Evaluation of Gloss or Sheen Uniformity.* h) Hiding/Contrast Ratio—Hiding is the ability of a paint to obscure the surface and/or previous paint film. Hiding is determined by applying the paint under test to a contrast chart using a defined applicator for a defined wet paint layer thickness. The contrast ratio is expressed as the quotient of the remission of the paint film on the black areas and the brightness of the complete opaque film on the white area. Hiding measurements reported in the subsequent tables were determined according to the contrast ratio measurement described in ASTM D2805-96a: *Standard Test Method for Hiding Power of Paints by Reflectometry.* i) Whiteness (or brightness)—The whiteness of a paint film is specified as the reflectance of a paint film of such a thickness that has the same reflectance over a white as over a black substrate. The reflectance is defined by the luminous diffuse reflectance factor also referred to as the Y-tristimulus value. This value is expressed as a percentage. The tristimulus value Y corresponds to the directional reflectance RY. RY is expressed as the directional reflectance of the sample with the green tristimulus filter using illuminant C operating on 12.0 V (color temperature about 2980° K). Measurements were made according to ASTM E313-00: *Standard Practice for Calculating Yellowness and Whiteness Indices from Instrumentally Measured Color Coordinates.* j) Scrub Resistance—The ability of a paint film to resist abrasive cleaning that might wash the paint film off the surface. Scrub resistance may be directly related to the ratio of resin to pigment in paint; the more resin in the product, the better the scrub resistance. Measurements were made according to ASTM D2486-96: *Standard Test Method for Scrub Resistance of Wall Coatings.*

Example 4

UCAR® 367 Vinyl-Acrylic Flat Paint Properties of Ethoxylated RCL and High Molecular Weight Hydroxyethylcellulose (HEC)

The paint performance properties of ethoxylated RCL as produced in Example 1 were compared against those of Natrosol® 250 HHR hydroxyethylcellulose (HEC), marketed by Hercules Incorporated, Aqualon Division, Wilmington, Del. This HEC was made by reacting purified cotton linters with ethylene oxide in the presence of an alkali. The average ethoxyl molar substitution of this polymer was ~2.5.

The details of the UCAR 367 vinyl-acrylic flat paint formula are shown in Table 1.

TABLE 1

UCAR 367 Vinyl-Acrylic Interior Flat Paint Formula (PVC = 60%)

| Ingredient | Supplier | Quantity (parts) |
| --- | --- | --- |
| Distilled Water | | 130.5 |
| Dispersant (Tamol 731A) | Rohm and Haas Company | 4.8 |
| Dispersant (potassium tripolyphosphate) | | 1.0 |
| Triton N-101 surfactant | Dow Chemical Company | 2.3 |
| AMP-95 (2-amino-2-methyl-1-propanol) | Angus Chemical Company | 1.0 |
| Propylene Glycol | | 18.1 |
| Colloid 640 Antifoam | Rhone-Poulenc Inc. | 2.0 |
| Distilled Water | | 97.0 |
| Titanium dioxide (Ti-Pure ® R-931) | E. I Dupont de Nemours & Co. | 156.6 |
| Satintone W calcined clay | Engelhard Industries | 130.5 |
| ECC # 1 white calcium carbonate | ECC International | 208.8 |
| Disperse to Hegman 4 to 5 and let down the following ingredients at slower mixing speed. | | |
| Letdown: | | |
| UCAR 367 vinyl-acrylic latex (solids = 56.5%) | Dow Chemical Company | 236.1 |
| Texanol (2,2,4-Trimethyl-1,3-pentanediol-monoisobutyrate) | Eastman Chemical Company | 8.3 |
| Colloid 640 Antifoam | Rhone-Poulenc Inc. | 2.0 |
| Biocide (Proxel ® GXL) | Arch Biocides | 1.0 |
| Total | | 1000.0 |

To the above base paint (230 g) was added an appropriate amount of the thickener/rheology modifier (as a 2.0 wt % solution of the thickener in water) to adjust the Stormer viscosity of the paint to 97±3 KU.

The paint performance properties of a high molecular weight hydroxyethylcellulose (HEC) (Natrosol® HEC 250 HHR) and ethoxylated RCL of the present invention in the UCAR 367 vinyl-acrylic flat paint are shown in Table 2.

TABLE 2

Vinyl-Acrylic Flat Paint Properties Thickened with HE-RCL and HEC

| Thickener | Thickening Efficiency (lb/100 gal) | Stormer Viscosity (KU) Initial | Stormer Viscosity (KU) Overnight | ICI Viscosity (poise) | Leneta Leveling | Sag (mils) | Rub Up | Colorant Compatibility (ΔE) Color Acceptance | Hiding |
|---|---|---|---|---|---|---|---|---|---|
| Natrosol ® HEC 250 HHR | 5.3 | 100 | 101 | 0.75 | 4 | 9 | 0.52 | Control | 0.983 |
| Ethoxylated RCL | 4.6 | 100 | 102 | 0.68 | 4 | 9 | 0.46 | 0.25 | 0.984 |

As can seen from data in the above table, the ethoxylated RCL was ~13% more efficient than the commercial high molecular weight HEC (Natrosol® 250 HHR HEC) in thickening the paint. Other paint properties of ethoxylated RCL and Natrosol® 250 HHR HEC, including the colorant compatibility, were about the same, in spite of the observed brown color of the ethoxylated RCL used in the paint of Example 4.

Example 5

UCAR 379G Vinyl-Acrylic Flat Paint Properties Thickened with Ethoxylated RCL The performance of ethoxylated RCL samples, as produced in Example 1, was compared against that of Natrosol® hydroxyethylcellulose (HEC), marketed by Hercules Incorporated, Aqualon Division, Wilmington, Del. Natrosol® HEC was made by reacting purified cotton linters with ethylene oxide in the presence of an alkali. The average ethoxyl molar substitution of this polymer is 2.5.

The details of the UCAR 367 vinyl-acrylic flat paint formula are shown in Table 3.

TABLE 3

UCAR 379G Vinyl-Acrylic Flat Paint Formula (PVC = 70%)

| Ingredient | Chemical Description | Supplier | Quantity (parts) |
|---|---|---|---|
| Distilled Water | | | 193.94 |
| Nuosept 95 | 50% Aqueous solution of non-metallic, non-chlorinated organic compounds | International Specialty Products | 2.49 |
| Tamol 731A | Sodium salt of a carboxylated polyelectrolyte | Rohm and Haas Company | 4.98 |
| Igepal CO-660 | Ethoxylated nonionic surfactant | Rhone-Poulenc Inc. | 2.38 |
| Igepal CO-897 | Ethoxylated nonionic surfactant | Rhone-Poulenc Inc. | 3.36 |
| AMP-95 | 2-Amino-2-methyl-propanol | Angus Chemical Company | 1.08 |

TABLE 3-continued

UCAR 379G Vinyl-Acrylic Flat Paint Formula (PVC = 70%)

| Ingredient | Chemical Description | Supplier | Quantity (parts) |
|---|---|---|---|
| Propylene Glycol | | J. T. Baker | 14.07 |
| Rhodeline 640 | Hydrophobic silica-type defoamer | Rhodia | 1.08 |
| Distilled Water | | | 108.22 |
| Ti-Pure R-931 TiO2 | Titanium dioxide | E. I. DuPont de Nemours & Co. | 81.17 |
| ASP NC Clay | | Engelhard Corporation | 216.45 |
| #10 White Calcium Carbonate | Calcium carbonate | Imerys | 162.33 |
| Celite 281 | Diatomaceous earth | Manville Specialty Products Group | 27.05 |
| Disperse the above mixture to Hegman 4 to 5 and add the following ingredients at slower speed | | | |
| Letdown | | | |
| Ucar Latex 379G | Vinyl-acrylic latex | Dow Chemical Company | 160.00 |
| Texanol | 2,2,4-Trimethyl-1,3-pentanediol-monoisobutyrate | Eastman Chemical Company | 8.55 |
| Rhodeline 640 | Hydrophobic silica-type defoamer | Rhodia | 2.05 |
| Propylene Glycol | | J. T. Baker | 10.82 |
| Total | | | 1000.00 |

To the above base paint (220 g) was added an appropriate amount of the thickener/rheology modifier (as a 2.0 wt % solution of the thickener in water) to adjust the Stormer viscosity of the paint to 97±3 KU.

The paint performance properties of a high molecular weight hydroxyethylcellulose (HEC) (Natrosol® HEC 250 HHR) and ethoxylated RCL of the present invention in the UCAR 379G vinyl-acrylic flat paint are shown in Table 4.

TABLE 4

Vinyl-Acrylic Flat Paint Properties Thickened with HE-RCL and HEC

| Thickener Description | BF Viscosity (1%, cps) | TE (wt %) | Stormer Viscosity (KU, overnight) | ICI Viscosity (poise) | Sag (mils) | Leneta Leveling | Gloss 60° | Hiding Contrast | Whiteness (%) | Scrub Resistance (cycles) |
|---|---|---|---|---|---|---|---|---|---|---|
| Natrosal ® HEC 250 HHR | 3,560 | 0.42 | 101 | 0.56 | 10 | 5 | 2.5 | 0.980 | 75.91 | 121/129 |

TABLE 4-continued

Vinyl-Acrylic Flat Paint Properties Thickened with HE-RCL and HEC

| Thickener Description | BF Viscosity (1%, cps) | TE (wt %) | Stormer Viscosity (KU, overnight) | ICI Viscosity (poise) | Sag (mils) | Leneta Leveling | Gloss 60° | Hiding Contrast | Whiteness (%) | Scrub Resistance (cycles) |
|---|---|---|---|---|---|---|---|---|---|---|
| Ethoxylated RCL | 5,860 | 0.39 | 101 | 0.46 | 10 | 5 | 2.5 | 0.980 | 72.65 | 136/162 |

As can be seen, the ethoxylated RCL was about 8% more efficient than the high molecular weight HEC (Natrosol® HEC 250 HHR) in thickening the paint to the same Stormer viscosity (~100 KU). It can also be seen that the paint containing the ethoxylated RCL exhibited a whiteness value of 72.65% in spite of the observed brown color of the ethoxylated RCL used in the paint.

Example 6

Acronol 290D Styrene-Acrylic Flat Paint Properties (Pigment volume concentration=85%) of Carboxymethylated RCL The paint performance of carboxymethylated RCL (CM-RCL), as produced in Example 2, was compared against those of a high molecular weight carboxymethylcellulose (CMC) made from purified cotton linters. This high molecular weight CMC is available from Hercules Incorporated, Aqualon Division, Wilmington, Del. The carboxymethyl degree of substitution (DS) of the CM-RCL and that of the high molecular CMC was ~1.1.

The details of the Acronol 290D styrene-acrylic flat paint formula (PVC=85%) are shown in Table 5.

TABLE 5

Acronol 290D Styrene-Acrylic Flat Paint Formula

| Ingredient | Chemical Description | Supplier | Quantity (parts) |
|---|---|---|---|
| Distilled Water | | | 135 |
| Calgon N | Sodium hexa metaphosphate | BK Giulini Chemie | 2 |
| Pigment | Sodium salt of poly | BASF | 3 |

TABLE 5-continued

Acronol 290D Styrene-Acrylic Flat Paint Formula

| Ingredient | Chemical Description | Supplier | Quantity (parts) |
|---|---|---|---|
| Dispersant A | (acrylic acid) | | |
| Agitan 260 | Blend of fatty compound, hydrophobic silica and aromatic-free oils | Bayer | 2 |
| Preventol D7 | Aqueous, formaldehyde-free formulation of various isothiazolinones | Münzig Chemie | 2 |
| Kronos 2190 | Titanium dioxide | Kronos | 80 |
| Omyacarb 2 GU | $CaCO_3$, mean particle size: 2.5 µm | Omya | 190 |
| Omyacarb 5 GU | $CaCO_3$, mean particle size: 5 µm | Omya | 272 |
| Micro-Talc W.T.1 | $SiO_2$, mean particle size: 4 µm | Omya | 20 |
| Mix the above ingredients for 15 min @ 5000 rpm. Then add stepwise the following with slow speed mixing: | | | |
| Acronal 290D | Styrene-acrylic latex (50%) | BASF | 75 |
| Dowanol PM | Propylene glycol monomethyl ether | Dow Chemical | 9 |
| Texanol | 2,2,4-Trimethyl-1,3-pentanediol-monoisobutyrate | Eastman | 15 |
| Rheology modifier/water | | | 195 |
| Total | | | 1000 |

To the base paint, an appropriate amount of thickener and water added to achieve a Stormer viscosity of about 97±3 KU.

The paint performance properties carboxymethylated RCL (CM-RCL) and CMC made from purified cotton linters are shown in Table 6.

TABLE 6

Styrene-Acrylic Flat Paint Thickened with CM-RCL and CMC

| Thickener | Brookfield Viscosity (1%, cps) | TE (wt %) | Stormer Viscosity (overnight) KU | ICI (poise) | Leneta Levelling | Sag Resistance (µm) | Hiding (% @ 200 µm) | Whiteness (Y value) (%) |
|---|---|---|---|---|---|---|---|---|
| Carboxymethylated RCL | 8,050 | 0.28 | 101 | 0.75 | 3 | 350 | 99.2 | 83.88 |
| CMC from purified cotton linters | 7,450 | 0.36 | 102 | 0.70 | 3 | 400 | 99.1 | 84.27 |

As can be seen, the CM-RCL was about 28% more efficient in thickening the paint and provided paint properties comparable to those of the CMC made from purified cotton linters. It can also be seen that the paint containing the CM-RCL exhibited a whiteness value of 83.88% in spite of the observed brown color of the CM-RCL used in the paint. The paint containing the CM-RCL also exhibited equivalent hiding properties to paint containing CMC from purified cotton linters.

Example 7

Mowilith LDM 2110 Vinyl Acetate-Ethylene Latex Based Flat Paint Properties (Pigment volume concentration=60%) of Carboxymethylated RCL The paint performance of the above carboxymethylated RCL (CM-RCL), as produced in Example 2, were also compared against those of a high molecular weight carboxymethylcellulose (CMC) in Mowilith LDM 2110 vinyl acetate-ethylene latex based flat paint formula.

The details of the Mowilith LDM 2110 vinyl acetate-ethylene latex based flat paint formula (PVC=60%) are shown in Table 7.

TABLE 7

Mowilith LDM 2110 Vinyl Acetate-Ethylene Latex Based Flat Paint Formula (PVC = 60%)

| Ingredient | Chemical Description | Supplier | Quantity (wt %) |
|---|---|---|---|
| Distilled Water | | | 136.0 |
| Calgon N | Sodium hexa metaphosphate | BK Giulini Chemie | 1.5 |
| Pigment Dispersant A | Sodium salt of poly (acrylic acid) | BASF | 3.1 |
| Agitan 260 | Blend of fatty acids, hydrophobic silica and aromatic-free oils | Bayer | 2.6 |
| Preventol D7 | Aqueous, formaldehyde-free formulation of various isothiazolinones | Münzig Chemie | 2.0 |
| Kronos 2190 | Titanium dioxide | Kronos | 122.7 |
| Omyacarb 2 GU | CaCO3 mean particle size: 2.5 μm | Omya | 123.7 |
| Omyacarb 5 GU | CaCO3 mean particle size: 5 μm | Omya | 185.1 |
| Micro-Talc W.T.1 | SiO2 mean particle size: 4 μm | Omya | 51.1 |
| Mix the above mixture for 15 minutes at 5000 rpm. Then add stepwise the following with slow speed mixing. | | | |
| Mowilith LDM 1871 | Vinyl acetate-ethylene latex (53%) | Celanese | 234.2 |
| Dowanol PM | Propyleneglycol monomethyl ether | Dow Chemical | 15.3 |
| Texanol | 2,2,4-Trimethyl-1,3-pentanediol-monoisobutyrate | Eastman | 15.3 |
| Rheology modifier/water | | | 107.4 |
| Total | | | 1000.0 |

To the base paint, an appropriate amount of the thickener and water were added to achieve a Stormer viscosity of 97±3 KU.

The paint performance properties of CM-RCL and CMC are shown in Table 8.

TABLE 8

Vinyl Acetate-Ethylene Based Flat Paint Properties Thickened with CM-RCL and CMC

| Thickener | Brookfield Viscosity (1%, cps) | TE (wt %) | Stormer Viscosity (overnight KU) | ICI (poise) | Leneta Levelling | Sag Resistance (μm) | Hiding Power (% @ 200 μm) | Whiteness (Y value) |
|---|---|---|---|---|---|---|---|---|
| Carboxymethylated RCL | 8,300 | 0.23 | 103 | 1.25 | 2 | 600 | 98.2 | 85.11 |
| CMC from purified cotton linters | 8,900 | 0.27 | 106 | 1.25 | 2 | 600 | 98.0 | 85.7 |

As can be seen, the carboxymethylated RCL had paint properties equivalent to those of CMC made from purified cotton linters. It can also be seen that the paint containing the CM-RCL exhibited a whiteness value of 85.11% in spite of the observed brown color of the CM-RCL used in the paint. The paint containing the CM-RCL also exhibited equivalent hiding properties to paint containing CMC from purified cotton linters.

Example 8

Acronol 290D Styrenel-Acrylic Flat Paint Properties (Pigment volume concentration=85%) of Methylhydroxyethylated RCL The paint properties of methylhydroxyethylated RCL (MHE-RCL), as produced in Example 3, and those of high molecular weight methylhydroxyethylcellulose (MHEC) were compared in Acronol 290D styrene-acrylic flat paint formula (see Table 5). The high molecular weight methylhydroxyethylcellulose (Culminal® MHEC) made from purified cotton linters is available from Hercules Incorporated, Aqualon Division, Wilmington, Del. The methyl degree of substitution and hydroxyethyl molar substitution of the both the products were 1.8 and 0.3, respectively.

The paint performance properties are shown in Table 9.

TABLE 9

Styrene-Acrylic Flat Paint Properties (PVC = 85%)
Thickened with MHE-RCL and MHEC

| Thickener | Brookfield Viscosity (1%, cps) | TE (wt %) | Stormer Viscosity (overnight KU) | ICI (poise) | Leneta Levelling | Sag Resistance (μm) | Hiding (% @ 200 μm) | Whiteness (Y value) |
|---|---|---|---|---|---|---|---|---|
| Culminal ® MHEC | 7,500 | 0.25 | 102 | 0.95 | 3 | 600 | 98.9 | 84.81 |
| Methylhydroxyethylated RCL | 8,350 | 0.25 | 106 | 0.80 | 3 | 600 | 99.0 | 84.23 |

As can be seen, the paint properties of methylhydroxyethylated RCL were comparable to those of Culminal® MHPC made from purified cotton linters. It can also be seen that the paint containing the MHE-RCL exhibited a whiteness value of 84.23% in spite of the observed brown color of the MHE-RCL used in the paint. The paint containing the MHE-RCL also exhibited equivalent hiding properties to paint containing Culminal® MHPC from purified cotton linters.

Example 9

Mowilith LDM 2110 Vinyl Acetate-Ethylene Latex Based Flat Paint Properties (Pigment volume concentration=60%) of Methylhydroxyethylated RCL The paint performance of methylhydroxyethylated RCL (MHE-RCL), as produced in Example 3, was compared against that of a high molecular weight methylhydroxyethylcellulose (Culminal® MHEC) made from purified cotton linters and available from Hercules Incorporated, Aqualon Division, Wilmington, Del. The methyl degree of substitution and hydroxyethyl molar substitution of both products were 1.8 and 0.3, respectively. The paint performance properties are summarized in Table 10.

TABLE 10

Vinyl Acetate-Ethylene Latex Based Flat Paint Properties (PVC = 60%)
Thickened with Methylhydroxyethylated RCL and MHEC

| Thickener | Brookfield Viscosity (1%, cps) | TE (wt %) | Stormer Viscosity (overnight KU) | ICI (poise) | Leneta Levelling | Sag Resistance (μm) | Hiding (% @ 200 μm) | Whiteness (Y value) |
|---|---|---|---|---|---|---|---|---|
| Culminal ® MHEC | 6,950 | 0.15 | 97 | 1.20 | 3 | 600 | 97.6 | 85.47 |
| Methylhydroxyethylated RCL | 7,950 | 0.15 | 99 | 1.20 | 3 | 600 | 98.0 | 94.93 |

As can be seen, the paint properties of methylhydroxyethylated RCL were comparable to those of Culminal® MHEC made from purified cotton linters. It can also be seen that the paint containing the MHE-RCL exhibited a whiteness value of 94.93% in spite of the observed brown color of the MHE-RCL used in the paint. The paint containing the MHE-RCL also exhibited equivalent hiding properties to paint containing Culminal® MHEC from purified cotton linters.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed:

1. A water-borne coating composition comprising an ether derivative of raw cotton linters (RCL), a latex polymer, and water, wherein the ether derivative of RCL has been prepared from RCL that have been cut prior to etherification and wherein the ether derivative of RCL has a particle size having a 50% median value in dry powder form of less than about 100.0 μm, as measured using laser diffraction, wherein the water-borne coating composition further comprises a pigment and wherein the water-borne coating has a pigment volume concentration (PVC) upper limit of 85%.

2. The water-borne coating composition of claim 1, wherein the ether derivative of RCL is selected from the group consisting of ethoxylated RCL, propoxylated RCL, methylated RCL, methylated ethoxylated RCL, methylated propoxylated RCL, ethoxylated ethylated RCL, carboxymethylated RCL, hydrophobically modified ethoxylated RCL, hydrophobically modified ethoxylated ethylated RCL, hydrophobically modified carboxymethylated RCL, hydrophobically modified ethoxylated carboxymethylated RCL, and hydrophobically modified ethoxylated sulfoalkylated RCL.

3. The water-borne composition of claim 2, wherein the ether derivative of RCL comprises ethoxylated RCL.

4. The water-borne composition of claim 2, wherein the ether derivative of RCL comprises carboxymethylated RCL.

5. The water-borne composition of claim 2, wherein the ether derivative of RCL comprises methylhydroxyethylated RCL.

6. The water-borne composition of claim 2, wherein the water-borne coating composition further comprises one or more of a binder, a dispersant, a defoamer, a wet-edge agent, a preservative, a coalescing agent, a biocide, a humectant, a pH modifier, and a colorant.

7. The water-borne composition of claim 2 wherein the ether derivative of RCL is prepared from a loose mass of comminuted raw cotton linter fibers that a) has a bulk density of at least 8 g/100 ml and b) wherein at least 95% of RCL fibers pass through a US standard sieve size #100 (150 μm opening).

8. The water-borne composition of claim 2 wherein the ether derivative of RCL is prepared from a loose mass of comminuted raw cotton linter fibers that a) has a bulk density of at least 8 g/100 ml and b) wherein at least 95% of the RCL fibers through a US standard sieve size #200 (75 µm opening).

9. The water-borne composition of claim 2 wherein the ether derivative of RCL is prepared from a loose mass of comminuted raw cotton linter fibers that a) has a bulk density of at least 8 g/100 ml and b) wherein at least 95% of RCL fibers pass through a US standard sieve size #325 (45 µm opening).

10. The water-borne coating composition of claim 1, wherein the latex polymer is selected from the group consisting of acrylics, vinyl-acrylics, styrene-acrylics, vinyls, alkyds, cellulosics, coumarone-indenes, epoxies, esters, hydrocarbons, melamines, natural resins, oleo resins, phenolics, polyamides, polyesters, rosins, silicones, styrenes, terpenes, ureas, and urethanes.

11. The water-borne coating composition of claim 1, wherein the pigment is selected from the group consisting of calcium carbonate, diatomaceous earth, mica, hydrated aluminum oxide, barium sulfate, calcium silicate, clay, silica, talc, titanium dioxide, zinc oxide, aluminum silicate, nepheline syenite, and mixtures thereof.

12. The water-borne coating composition of claim 1, wherein the water-borne coating has a pigment volume concentration (PVC) upper limit of 75%.

13. The water-borne coating composition of claim 12, wherein the water-borne coating has a pigment volume concentration (PVC) upper limit of 65%.

14. The water-borne coating composition of claim 1, wherein the water-borne coating has a pigment volume concentration (PVC) lower limit of 10%.

15. The water-borne coating composition of claim 1, wherein the water-borne coating has a pigment volume concentration (PVC) lower limit of 20%.

16. The water-borne composition of claim 1 wherein the ether derivative of RCL has been milled.

17. The water-borne composition of claim 1 wherein the ether derivative of RCL has a particle size having a 50% median value in dry powder form of less than about 95.0 µm, as measured using laser diffraction.

18. The water-borne composition of claim 1 wherein the ether derivative of RCL has a particle size having a 50% median value in dry powder form of less than about 80.0 µm, as measured using laser diffraction.

* * * * *